US009641630B2

(12) United States Patent
Broussard et al.

(10) Patent No.: US 9,641,630 B2
(45) Date of Patent: May 2, 2017

(54) LOCATION-ENFORCED DATA MANAGEMENT IN COMPLEX MULTI-REGION COMPUTING

(71) Applicant: International Business Machines Corporation, Armonk, NY (US)

(72) Inventors: Scott J. Broussard, Cedar Park, TX (US); Jacob D. Eisinger, Austin, TX (US); Ritu Mehta, Austin, TX (US); Karthikeyan Ramamoorthy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 14/570,665

(22) Filed: Dec. 15, 2014

(65) Prior Publication Data

US 2016/0173623 A1 Jun. 16, 2016

(51) Int. Cl.
| | |
|---|---|
| *H04L 29/06* | (2006.01) |
| *H04L 29/08* | (2006.01) |
| *H04W 4/02* | (2009.01) |

(52) U.S. Cl.
CPC .......... *H04L 67/18* (2013.01); *H04L 63/0428* (2013.01); *H04L 63/107* (2013.01); *H04W 4/02* (2013.01)

(58) Field of Classification Search
CPC ...... H04L 67/18; H04L 63/0428; H04L 67/32
(Continued)

(56) References Cited

U.S. PATENT DOCUMENTS

| | | |
|---|---|---|
| 8,402,086 B2 | 3/2013 | Driesen et al. |
| 8,676,593 B2 | 3/2014 | Nagpal et al. |
| (Continued) | | |

FOREIGN PATENT DOCUMENTS

| | | | |
|---|---|---|---|
| WO | 2011162825 A1 | 12/2011 | |
| WO | 2013101094 A1 | 7/2013 | |
| WO | WO 2013101094 A1 * | 7/2013 | ........... G01S 5/0242 |

OTHER PUBLICATIONS

D. Hardt, et al., The OAuth 2.0 Authorization Framework: RFC 6749, Internet Engineering Task Force, Oct. 2012, pp. 1-2, Microsoft Corporation, Published online at: https://datatracker.ietf.org/doc/rfc6749/.

*Primary Examiner* — Hadi Armouche
*Assistant Examiner* — Angela Holmes
(74) *Attorney, Agent, or Firm* — Lee Law, PLLC; Christopher B. Lee

(57) ABSTRACT

A location-reporting request is sent by a processor to at least one remote server. The location-reporting request requests processing of data away from a geo-location-aware client device and instructs any available server to respond with a reported geographic location. An asserted geographic location is received from a remote server available to process the data. A determination is made as to whether the asserted geographic location of the available remote server satisfies location-based data processing restrictions that regulate remote processing of the data away from the geo-location-aware client device. In response to determining that the asserted geographic location of the available remote server satisfies the location-based data processing restrictions, the asserted geographic location is verified using a geo-location assertion server. In response to a successful verification of (Continued)

the asserted geographic location of the available remote server, the data is sent to the available remote server to process.

17 Claims, 6 Drawing Sheets

(58) Field of Classification Search
USPC .......................................................... 713/168
See application file for complete search history.

(56) References Cited

U.S. PATENT DOCUMENTS

| 8,769,063 B2 | 7/2014 | Barton et al. |
| 2012/0212323 A1* | 8/2012 | Skaaksrud .......... G06F 21/6245 340/5.74 |

* cited by examiner

LOCATION-ENFORCED DATA MANAGEMENT IN COMPLEX MULTI-REGION COMPUTING

BACKGROUND

The present invention relates to data computational processing and storage within complex distributed systems. More particularly, the present invention relates to location-enforced data management in complex multi-region computing.

Computing applications may be used by users to create and manipulate data. Computing applications may also allow users to develop and collaborate on work projects, share information, and communicate with one another.

The technology described herein was conceived in response to an observation that prior technologies for geographically-distributed computing, such as cloud computing technologies, allow a user's data to be processed at any distributed server without consideration for where the particular server is geographically located. It was determined as a result of this observation that these forms of prior distributed computing technologies were problematic for users that had geographic restrictions on where their data may be processed.

BRIEF SUMMARY

A method includes sending, by a processor to at least one remote server, a location-reporting request that requests processing of data away from a geo-location-aware client device and that instructs any available server to respond with a reported geographic location. An asserted geographic location is received from a remote server available to process the data. A determination is made as to whether the asserted geographic location of the available remote server satisfies location-based data processing restrictions that regulate remote processing of the data away from the geo-location-aware client device. Responsive to determining that the asserted geographic location of the available remote server satisfies the location-based data processing restrictions, the asserted geographic location is verified using a geo-location assertion server. In response to a successful verification of the asserted geographic location of the available remote server, the data is sent to the available remote server to process. A system that performs the method and a computer program product that causes a computer to perform the method are also described.

An advantage of this technology is that it provides trusted independent third-party verification of physical geographic locations of remote servers.

An optional method of determining whether the asserted geographic location of the available remote server satisfies the location-based data processing restrictions that regulate remote processing of the data away from the geo-location-aware client device includes identifying at least one geo-location rule that defines the location-based data processing restrictions. The asserted geographic location of the available remote server is compared with the location-based data processing restrictions defined within the at least one geo-location rule. A determination is made as to whether the asserted geographic location complies with the location-based data processing restrictions defined within the at least one geo-location rule. A system that performs this optional method and a computer program product that causes a computer to perform the optional method are also described.

An advantage of this technology is that it provides a geo-location rule that is usable by a geo-location-aware client device to determine whether a geographic location asserted by a remote server complies with the location-based restrictions defined within the geo-location rule, and that the asserted location is correct and trustworthy. As such, the geo-location-aware client device may pre-screen remote servers prior to validation of asserted server locations; may learn what types of data processing, if any, are allowed at the asserted remote server location; and may reduce verification requests to the geo-location assertion server if no data processing is allowed at the asserted location.

An optional method of verifying, responsive to determining that the asserted geographic location of the available remote server satisfies the location-based data processing restrictions, the asserted geographic location using the geo-location assertion server includes sending the asserted geographic location of the available remote server and a server identifier of the available remote server to the geo-location assertion server. A geo-location verification response is received from the geo-location assertion server that specifies whether the asserted geographic location is an accurate geographic location of the identified available remote server. A system that performs this optional method and a computer program product that causes a computer to perform the optional method are also described.

An advantage of this technology is that the geo-location assertion server provides a specific geo-location validation response that the geo-location-aware client device may use to confirm the asserted geographic location of a remote server. As such, the geo-location-aware client device may control distribution of data when sending data for processing at remote servers.

An optional method of receiving the geo-location verification response from the geo-location assertion server that specifies whether the asserted geographic location is the accurate geographic location of the identified available remote server includes receiving, in response to a successful verification of the asserted geographic location of the available remote server, a geo-location trust object within the geo-location verification response from the geo-location assertion server. In response to the asserted geographic location of the available remote server being inaccurate, a negative acknowledgement is received within the geo-location verification response from the geo-location assertion server. A system that performs this optional method and a computer program product that causes a computer to perform the optional method are also described.

An advantage of this technology is that the geo-location assertion server provides a geo-location trust object in response to validation of the asserted geographic location of the remote server, and provides a negative acknowledgement in response to an invalid asserted geographic location of the available remote server. As such, the geo-location-aware client device may receive a recognized form of trust object to authenticate the response from the geo-location assertion server, and may receive a confirmation of an invalid location where invalid remote server physical locations are detected by the geo-location assertion server.

DETAILED DESCRIPTION

Figure 1:
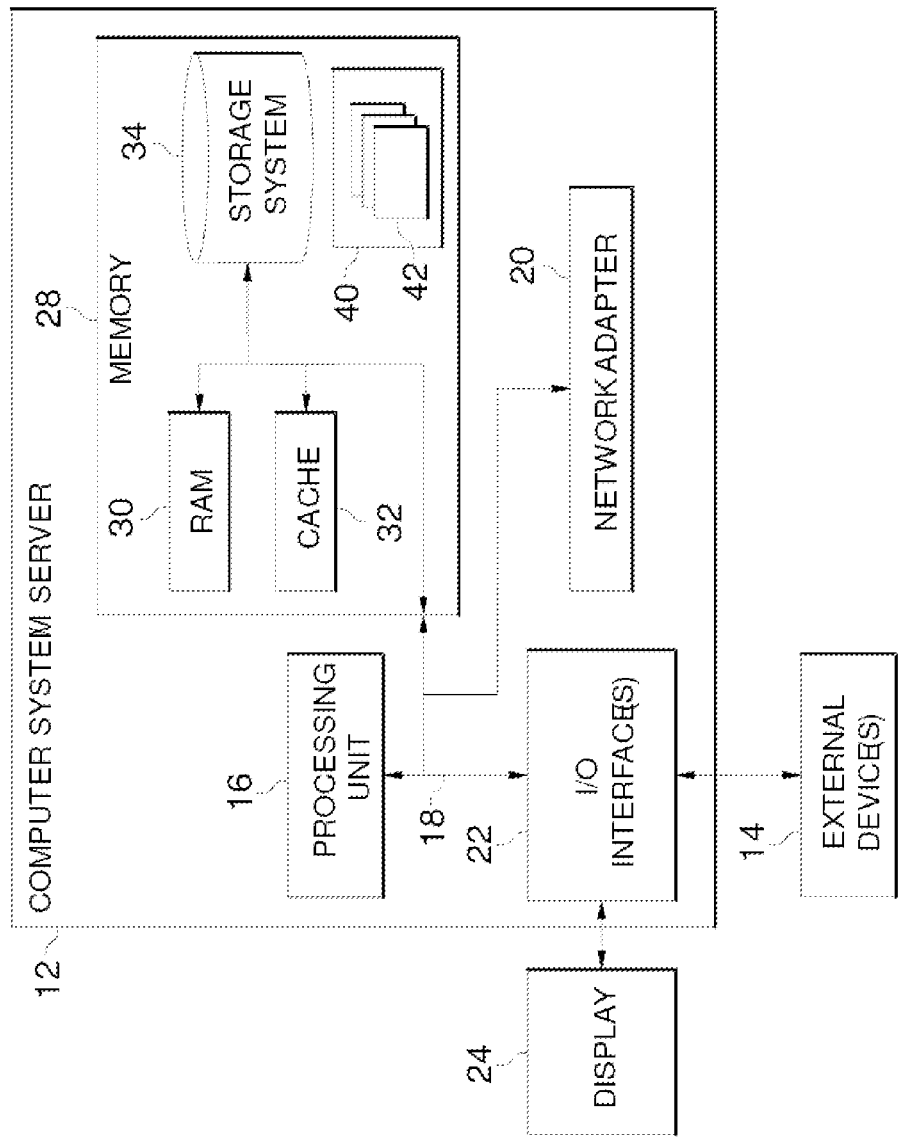
FIG. 1 depicts a cloud computing node according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides location-enforced data management in complex multi-region computing. The present technology solves a recognized geographic-region data storage and processing problem by providing technology that includes a new form of client device that utilizes distributed computing services, termed a "geo-location-aware" client device herein, to enforce location-based requirements/boundaries and/or geo-location rules (e.g., processing location or storage location constraints/restrictions) for geographically-distributed data computational processing within complex distributed computing environments, such as cloud computing environments. A new geo-location assertion server operates securely in cooperation with the geo-location-aware client device. The geo-location assertion server operates as a trusted third-party source of distributed/cloud server location verification for the geo-location-aware client device. The geo-location assertion server allows the geo-location-aware client devices that use cloud computing applications and storage to verify the locations of individual cloud servers designated to perform services for the geo-location-aware client devices. The geo-location assertion server may prevent the cloud servers from misrepresenting their physical locations, and as such prevent "spoofing" and other forms of misappropriation of data. The geo-location-aware client devices interact with the geo-location assertion server to confirm approved locations designated for application computational processing and data storage. As such, the geo-location assertion server solves a technical problem within such distributed/cloud computing environments, and provides an authentication service to confirm that the reported cloud server location is reliably within an asserted geographic region. The present technology allows the geo-location-aware client device to control computational processing locations and storage locations of data for regulatory, legal, enterprise, and other reasons. Architectural examples of components usable to implement the geo-location-aware client device and the geo-location assertion server are described in association with FIG. 1 below.

It should additionally be noted that because the geo-location-aware client device performs the independent third-party cloud server location verification using the geo-location assertion server prior to sending data to a cloud server for either computational processing or storage, only the geo-location-aware client device has visibility to the data until the location verification of the target cloud server is performed. A secure interface may be used for posting location information to be verified by the geo-location assertion server.

An example of geographic location verification of a remote server includes, among others, a geo-location-aware client device sending a location-reporting request to at least one remote server. The location-reporting request requests processing of data away from a geo-location-aware client device and instructs any available server to respond with a reported geographic location. An asserted geographic location may be received from a remote server that is available to process the data, and the geo-location-aware client device may determine whether the asserted geographic location of the available remote server satisfies location-based data processing restrictions that regulate remote processing of the data away from the geo-location-aware client device prior to performing a verification of the asserted geographic location. Responsive to determining that the asserted geographic location of the available remote server satisfies the location-based data processing restrictions, the geo-location-aware client device may verify the asserted geographic location using a geo-location assertion server, and may send the data to the available remote server to process in response to a successful verification of the asserted geographic location of the available remote server.

As another alternative, where the geo-location-aware client device knows of a particular remote server's existence (e.g., by service lookup, configuration bootstrapping, or runtime configuration), the geo-location-aware client device may issue a request to the geo-location assertion server for a verified location of the particular server. As another alternative, where use of servers within a particular geographic region is of interest or location-based data processing restrictions indicate that a particular geographic region be used for a particular form of data processing, the geo-location-aware client device may request the geo-location assertion server to respond with identifiers of servers that are available within the particular geographic region, and the geo-location-aware client device may receive a response from the geo-location assertion server that includes server identifiers that are pre-verified to be physically located within the respective geographic region. Within these alternative implementations, the geo-location-aware client device processing may be altered to process the location verification information as appropriate for the given implementation.

As described herein, the present technology may improve client device use and interoperations with distributed/cloud servers and services by allowing the geo-location-aware client devices to select location-verified servers to provide requested distributed/cloud services. Additionally, the technical problem of inadvertent distribution of data to prohibited/restricted geographical regions within a cloud computing environment is solved by the present technology, and the present technology may thereby improve data security and compliance with geographic cloud data processing restrictions.

As described herein, the term "data management" refers to any operations associated with computational data processing and/or data storage. Further, the phrase "data processing" and "processing of data" are used generally herein to refer to both computational data processing and data storage.

The location of the geo-location assertion server may be within the cloud as with other cloud services, where the geo-location assertion server receives asserted location information for an Internet protocol (IP) address, and verifies that the IP address originates from some location and/or enterprise. The geo-location assertion server may produce and return a trusted geo-location object that confirms that the location asserted by the cloud server is really served by the asserted location/enterprise, and that the asserted location is accurate. The trusted geo-location object may be entered into a geo-location assertion mapping database to create a trust chain between the geo-location-aware client device, the geo-location assertion server, and the geo-location assertion mapping database.

Depending upon the verified location of the server as compared to the specified geographic constraints, the data may be encrypted for storage. Additionally, the data may not be distributed at all to cloud servers that are located outside of the specified geographic constraints. For example, a state regulatory requirement may specify that healthcare data must be stored physically within the respective state. Alternatively, a requirement may be specified that when data is stored on a server in a given geographic region, such as a first state (e.g., the State of Texas on a server A), that data may be stored in a text format. A further requirement may be specified that if the same data is stored on a different server in a different geographic region, such as second state (e.g., the State of Kentucky on a server B), the same data must be encrypted. Further, a client application may specify that no data may be sent to any server located outside of the United States (e.g., to an overseas country on a Server C) for either processing or for storage.

Given that the geo-location-aware client device has specified storage locations/requirements, the geo-location-aware client device may also more efficiently process retrieved data. For example, the geo-location-aware client device would know that it may use the data as retrieved without further processing from the first state (e.g., the State of Texas server A) where the data was stored in the text format. Similarly, the geo-location-aware client device would know to first decrypt the data coming from the second state (e.g., the State of Kentucky server B).

Additionally, where data is moved for storage outside of work hours to locations that require data encryption, such as for storage cost reductions, the geo-location-aware client device may, for example, encrypt the data in association with an end of a work day and may move the data to a cloud server located in such a geographic location. The geo-location-aware client device may further retrieve the encrypted data at a beginning of a next business day, decrypt the data, and store the data in a cloud server located geographically where the data may be stored in a text format. As such, the present technology allows data to be moved and changed in form based upon the appropriate policy (e.g., enterprise and/or governmental policies). The geo-location-aware client device may implement the computational processing and storage constraints/rules and enforce the respective policies with the assistance of the geo-location assertion server.

The storage of data in encrypted form may further be useful in systems that retrieve entire large blocks of data, such as binary large objects (blobs). Alternatively, storage of unencrypted data may be useful for additional data usage and functionality such as data querying. Querying of data is not possible when the data is encrypted. As such, if encrypted data is to be searched and is of a reasonable size to be physically moved, the geo-location-aware client device may move the encrypted data to a specified geographic region that allows the data to be stored in an unencrypted form where it may be decrypted, stored, and queried. This movement of data may be to another cloud server that is physically located where the data may be stored in an unencrypted format, or to the client device itself as appropriate for a given implementation.

The requirements for the processing and/or storage location of the data may be determined at the provisioning time of a service, or may be determined during runtime at a time of an individual request for processing/storage of individual data sets. A geo-location policy may specify certain geographical areas for computation and certain geographical areas for storage, and these geographical areas may be the same or different, as appropriate for a given implementation. The geo-location policies may further designate how the data is stored, and the geo-location constraints within the geo-location policies may specify the designated location-based policy directives. Because the geo-location policies and geo-location constraints may specify a format of data at a particular location (e.g., encrypted for that location) and processing allowed to be performed on data by geographic region, the geo-location-aware client device may enforce the geo-location policy/constraints to control what data operations are permissible on the data at any particular geographic location. For example, outside of a given state, a geo-location policy and the specified geo-location constraints may indicate that no computation may be performed in a given geographical region and that the data must be encrypted for storage. The geo-location-aware client device may implement the geo-location policy and may control data distribution and data operations on behalf of an enterprise organization on a case-by-case basis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
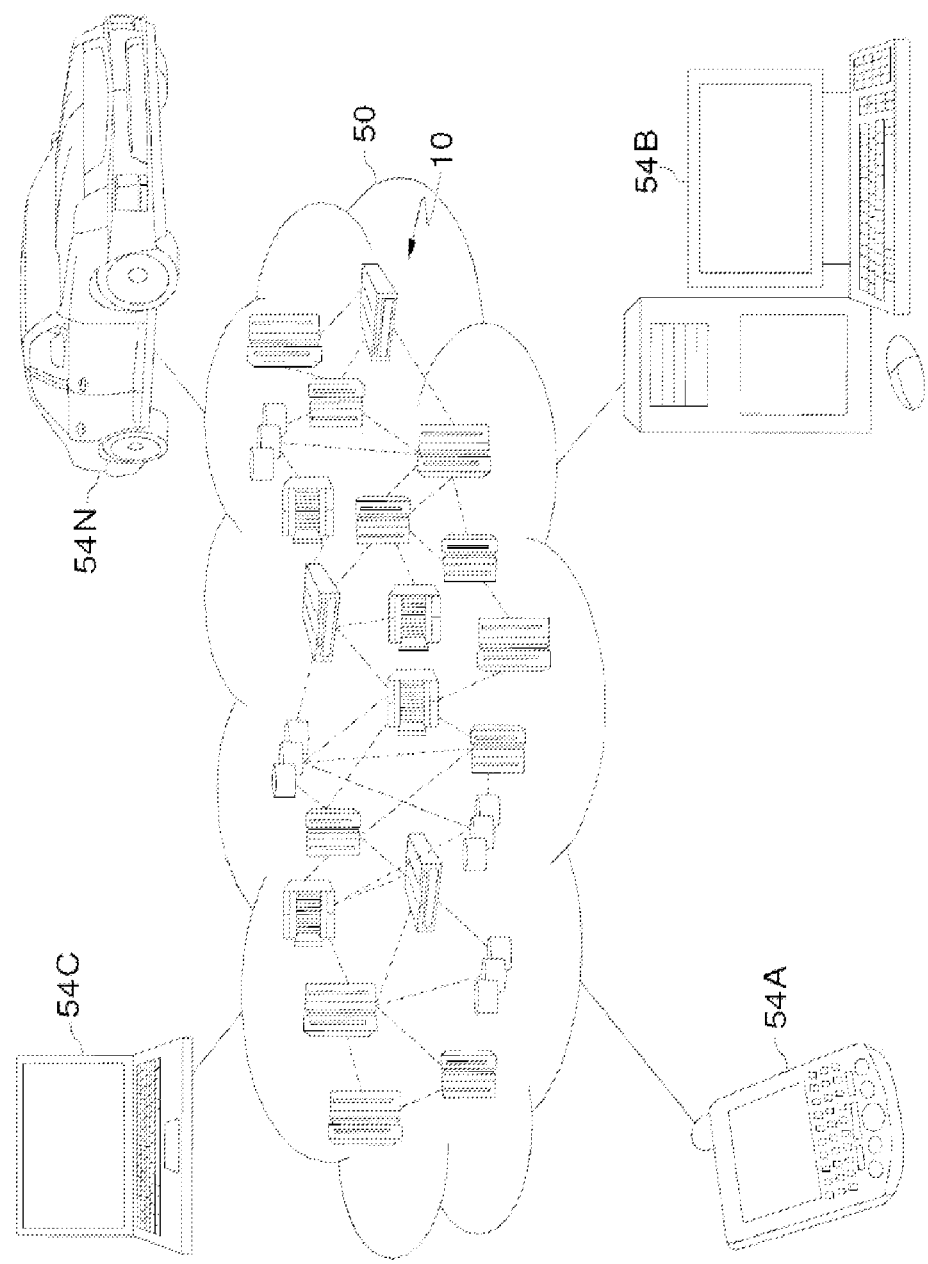
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
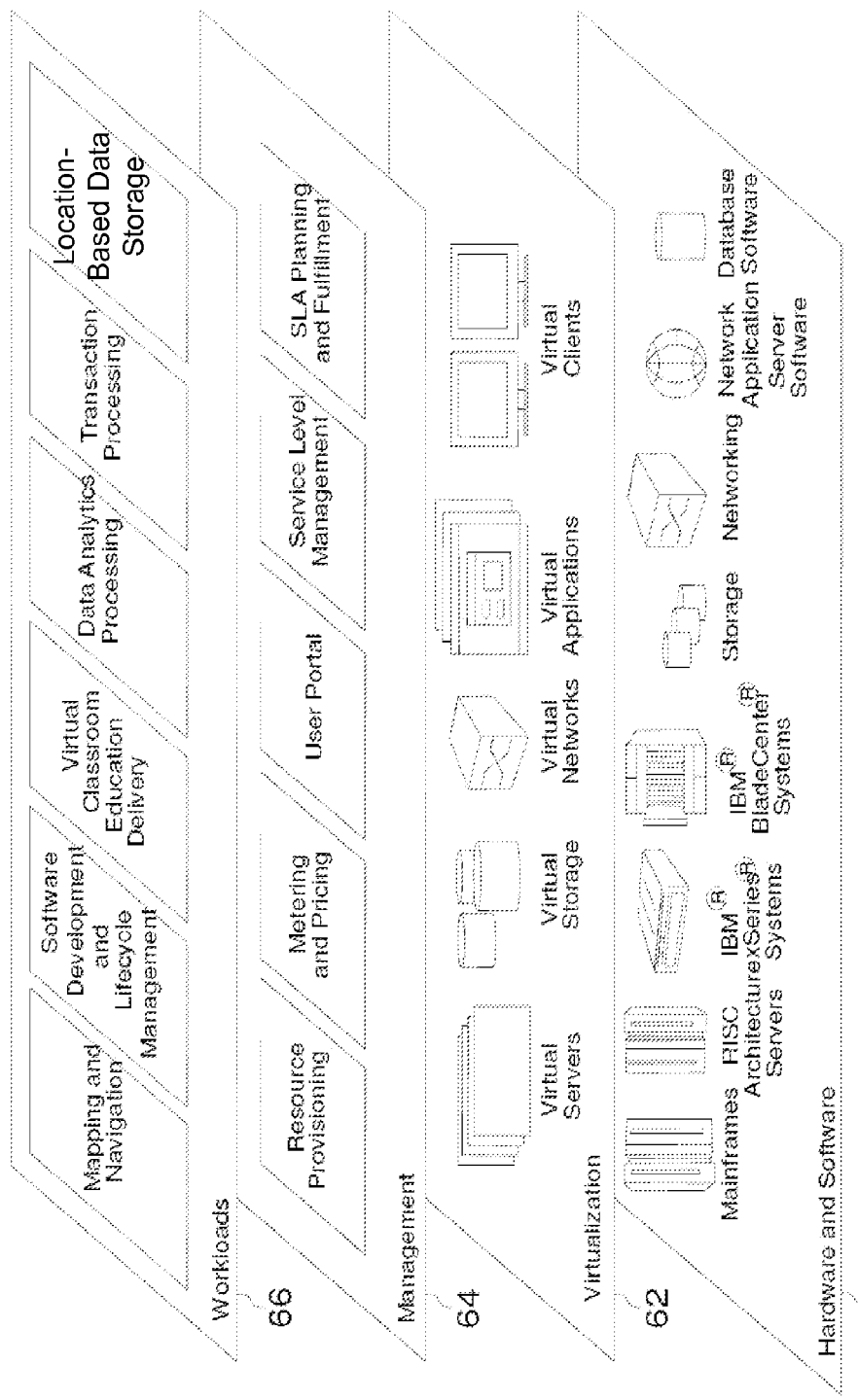
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the location-based data storage processing described herein.

It should be noted that conception of the present subject matter resulted from recognition of certain limitations associated with storage within cloud computing environments. For example, it was observed that cloud computing allows users a way to run applications and store data off of their personal computing devices, but that the physical geographical location of these systems are abstracted away from the user and the user does not know where the applications are executed or where their data is physically stored. As a consequence, if legal, corporate, or other requirements and regulations exist that restrict application execution and data storage to specific geographic areas, then an application may not be allowed to be executed in the cloud and data may not be allowed to be stored in the cloud. As an example, in the healthcare industry, healthcare data of individuals may be prohibited from flowing outside of a country's borders, yet may be stored outside of the country's borders if previous cloud technologies are utilized. Additionally, healthcare regulations may be different per country, where some countries may require that healthcare data be stored in an encrypted form. As a consequence, previous cloud-based services may be prohibited for processing of healthcare data. Additionally, corporations may, for example, prohibit storage of data in countries where a lack of regulation of cloud operation could result in release of cryptographic keys used to encrypt the stored data. As a further example, certain client data within certain legal domains may not be allowed to be passed outside of a country's borders or stored outside of the country's borders. In view of these observations, it was determined that it was desirable to provide a capability to specify cloud data storage and processing location requirements/boundaries and/or conditions, and to enforce specific geographic regions for data storage and processing in association with cloud computing. The present subject matter improves cloud computing and cloud storage by providing for location-enforced data management in complex multi-region computing, as described above and in more detail below. As such, improved cloud computing technology may be obtained through use of the present subject matter.

The location-enforced data management in complex multi-region computing described herein may be performed in real time to allow prompt determination and verification of data storage locations within a cloud computing environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 4:
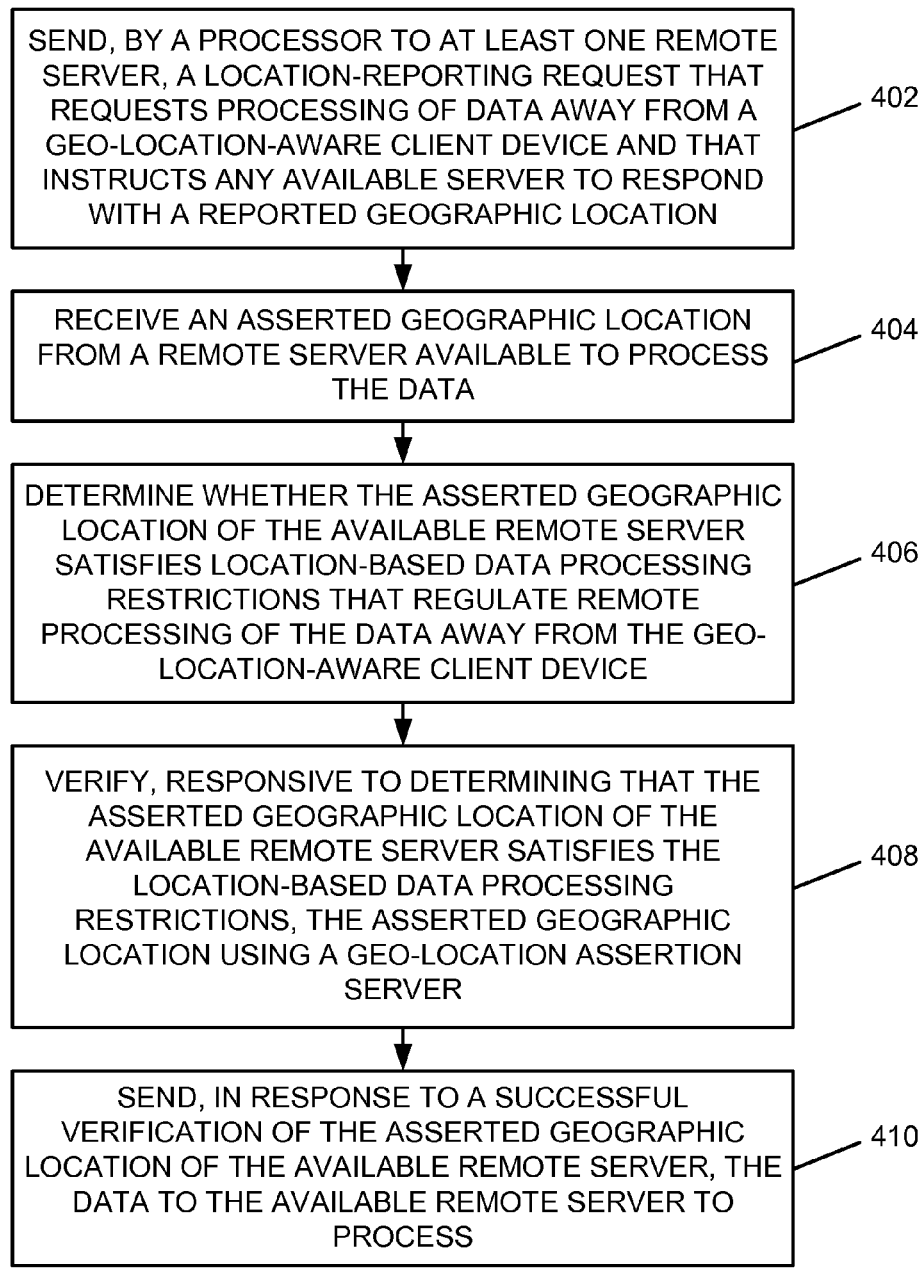
FIG. 4 is a flow chart of an example of an implementation of a process for location-enforced data management in complex multi-region computing according to an embodiment of the present subject matter.
Figure 5A:
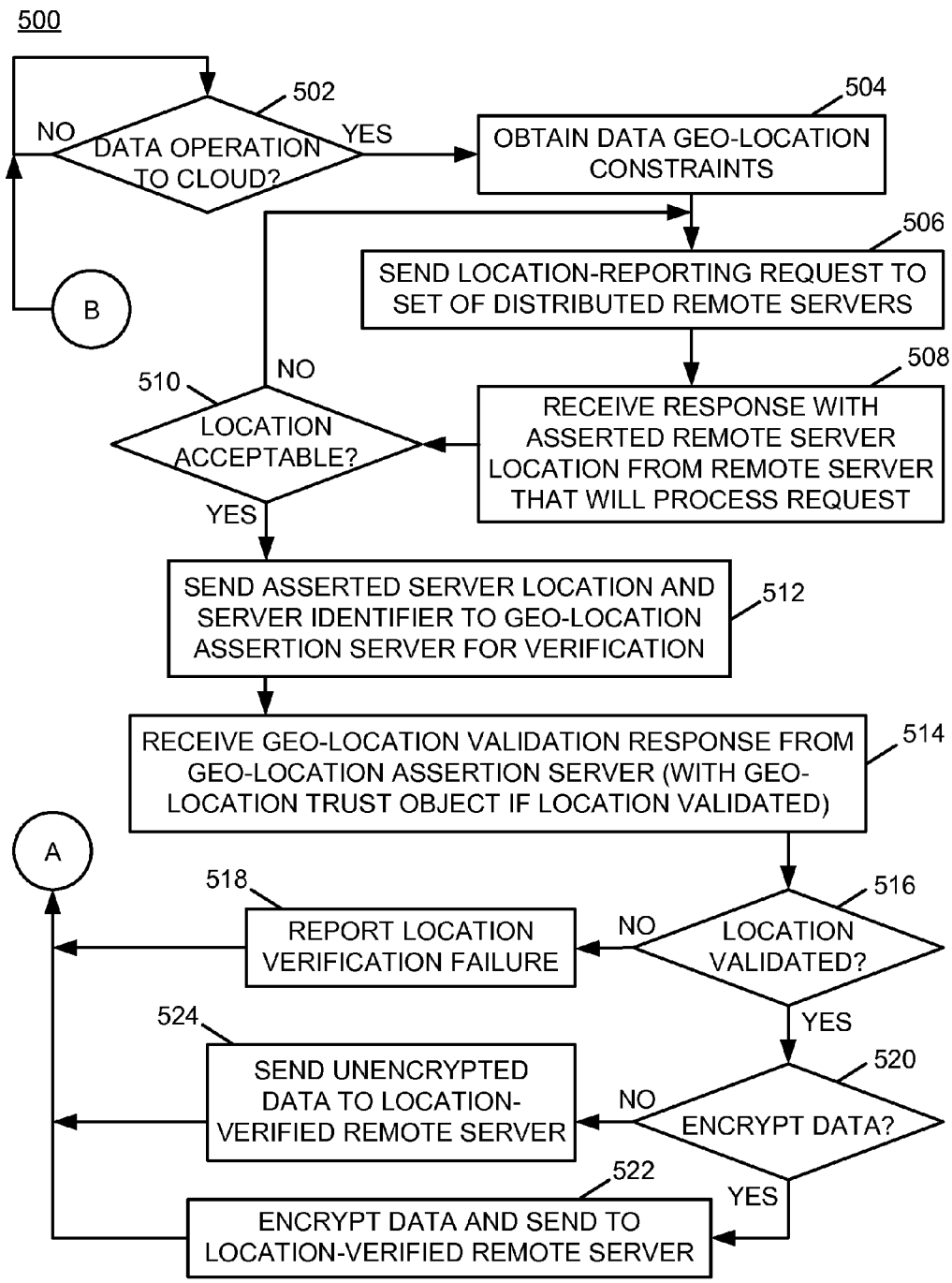
FIG. 5A is a flow chart of an example of an implementation of initial processing within a process for location-enforced data management in complex multi-region computing that provides additional detail regarding data accesses and data movement within a distributed computing platform according to an embodiment of the present subject matter.
Figure 5B:
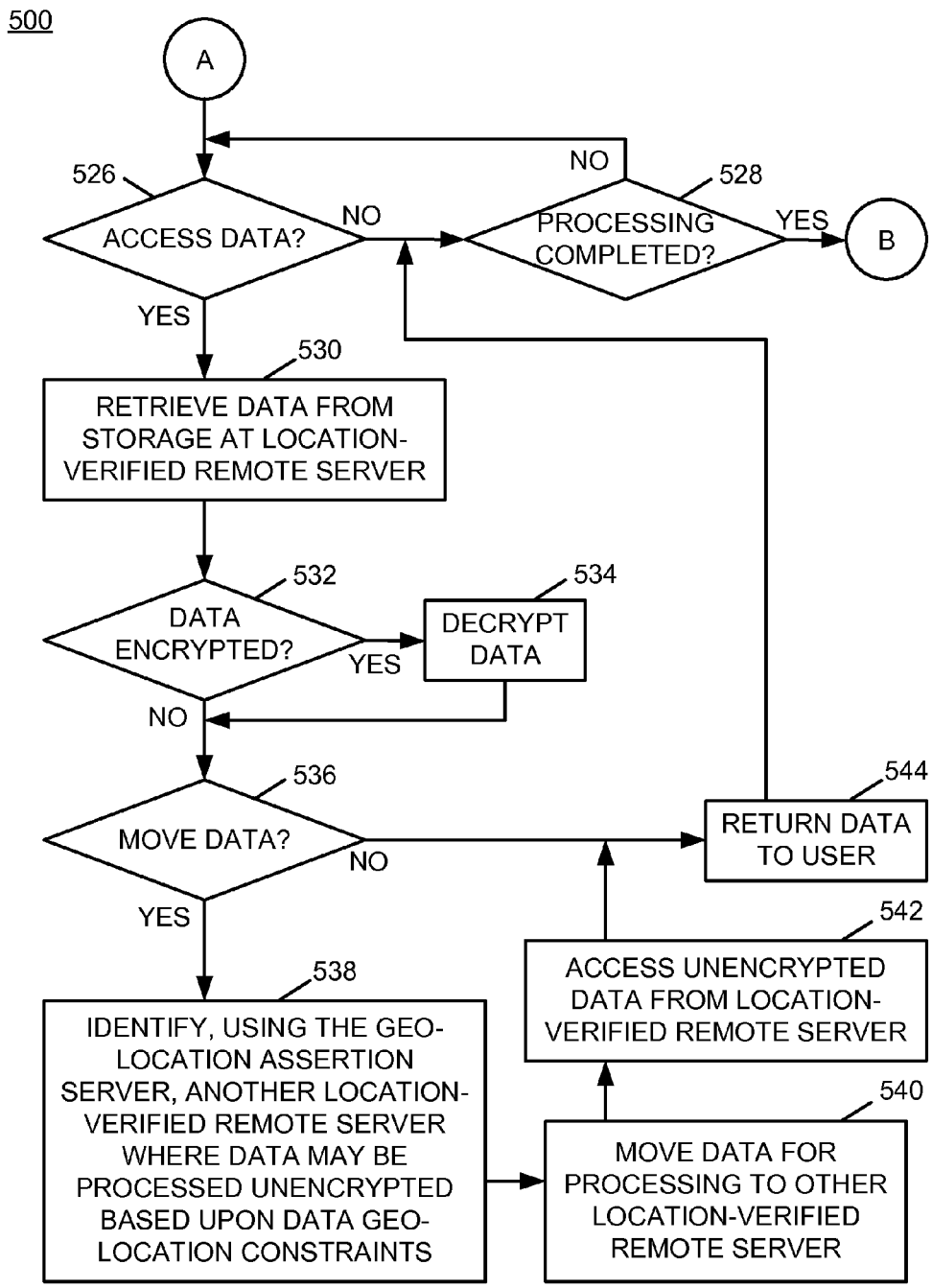
FIG. 5B is a flow chart of an example of an implementation of additional processing within a process for location-enforced data management in complex multi-region computing that provides additional detail regarding data accesses and data movement within a distributed computing platform according to an embodiment of the present subject matter.

FIG. 4 through FIG. 5B described below represent example processes that may be executed by devices, such as the one or more processors or processing units 16, to perform the automated location-enforced data management in complex multi-region computing associated with the present subject matter. Many other variations on the example processes are possible and all are considered within the scope of the present subject matter. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter. For any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

FIG. 4 is a flow chart of an example of an implementation of a process 400 for location-enforced data management in complex multi-region computing. The process 400 represents a computer-implemented method of performing the location-enforced data management in complex multi-region computing described herein. At block 402, the process 400 sends, by a processor to at least one remote server, a location-reporting request that requests processing of data away from a geo-location-aware client device and that instructs any available server to respond with a reported geographic location. At block 404, the process 400 receives an asserted geographic location from a remote server available to process the data. At block 406, the process 400 determines whether the asserted geographic location of the available remote server satisfies location-based data processing restrictions that regulate remote processing of the data away from the geo-location-aware client device. At block 408, the process 400 verifies, responsive to determining that the asserted geographic location of the available remote server satisfies the location-based data processing restrictions, the asserted geographic location using a geo-location assertion server. At block 410, the process 400 sends, in response to a successful verification of the asserted geographic location of the available remote server, the data to the available remote server to process.

It should be noted that the process 400 may be implemented in a variety of different manners. For example, while the process 400 describes sending a request to remote servers to request that available remote servers respond with their reported geographic location, with a subsequent verification of the reported geographic location, other approaches are possible to implement the geographic location verification of a remote server. For example, where the device that implements the process 400 knows of a particular remote server's existence, the process 400 may issue a request to the geo-location assertion server for a verified location of the particular server. As another alternative, where use of servers within a particular geographic region is of interest or location-based data processing restrictions indicate that a particular geographic region be used for a particular form of data processing, the process 400 may request the geo-location assertion server to respond with identifiers of servers that are available within the particular geographic region, and the process 400 may receive a response from the geo-location assertion server that includes server identifiers that are pre-verified to be physically located within the respective geographic region.

With respect to the preceding description of the process 400, structural and/or functional alternatives for implementation of the described activities include several possible alternatives for block 402 through block 410. For example, for block 402, where data has been written to a server within a known geographic region or to a server with a known geographic location, and where a data request is a data query to a remote server that is known to store the data (rather than a write to a remote server), the process 400 may alternatively retrieve the known geographic storage location before querying the remote server, and may receive at block 404 a response to the query that also includes the asserted geographic location in addition to the particular query response. Based upon the geographic location asserted by the remote server, the process 400 may determine at block 406 whether the asserted geographic location satisfies the location-based data restrictions. Additionally, the process 400 may continue with processing of the received data, or may discontinue use of the data if the server is unable to respond with the known storage location. As such, spoofing of server locations may further be prevented because a server that is placed in a distributed system without knowledge of a previously asserted geographic location where data is stored may be unable to respond with the proper asserted geographic location, and as such, the data returned by such a server may be prevented from being used for any additional processing.

Additionally with respect to block 404 of the process 400, depending on the importance and sensitivity of the information associated with the particular data processing activity (e.g., some information may not be specified for processing within a particular geographic region, whereas other information may have a particular geographic region specified for processing), if no asserted geographic location is returned from the remote server, the process 400 may derive the location of the server by applying other geo-location policies, such as deriving a geographic location from other information available via Internet communication (e.g., the Internet protocol address used for the communications). The derived geographic location may be used at block 406 to ensure that it satisfies the location-based data processing restrictions. As an alternative, a derived geographic location may be processed at block 406 to ensure the derived location satisfies a default highest-security geo-location.

It should be noted that data may be encoded granularly with information that specifies that different geo-location processing restrictions apply to different portions of the data. Alternatively, the location-based data processing restrictions may granularly identify different portions of data to be processed within different geographic locations. In such an implementation and further with respect to block 406, the process 400 may granularly process data to determine whether the particular portion of information used at a particular stage of processing is configured with geo-location restrictions, and may process each portion of data subject to the different geo-location processing restrictions. The process 400 may further be configured with default geo-location restrictions for any portion of data that does not have a specified geo-location restriction.

Further with respect to block 408, if a configured geo-location assertion server or service is unavailable or if a geo-location assertion server or service is not configured, the process 400 may implement its own remote server geographic location validation. Further regarding processing at block 410, the process 400 may send the data to the remote server after possibly encrypting the data or after performing other forms of translation (e.g., compression, or other transform or format translation). Further, if the response from the geo-location assertion server is not successfully received, then the process 400 may determine to communicate with another available remote server that responded to the data request if another remote server is available, or may report an error to an administrator to report that there may be an issue with the geo-location assertion server. Where the process 400 communicates with another available remote server, the process 400 may default to utilize encryption so that the data may be stored in any geographic region. It should further be noted, with respect to block 410, that the remote server may be utilized in a variety of ways, such as being used as an encrypted data binary large objected (BLOB) store, as being a plain text query engine, or otherwise as appropriate for a given implementation. As such, many structural and/or functional alternatives for implementation of the described activities of the process 400 are possible and all are considered within the scope of the present subject matter.

FIGS. 5A-5B illustrate a flow chart of an example of an implementation of a process 500 for location-enforced data management in complex multi-region computing that provides additional detail regarding data accesses and data movement within a distributed computing platform. The process 500 also represents a computer-implemented method of performing the location-enforced data management in complex multi-region computing described herein. FIG. 5A illustrates initial processing within the process 500. It should be noted that the process 500 may be implemented by a geo-location-aware client device, or may be provided as a service to a client device by a server operating within a cloud computing environment. The partitioning for implementation as a service within a cloud computing environment to a client device is not illustrated to reduce complexity within the description. However, such partitioning may be performed in a granular manner as appropriate for a given implementation. At decision point 502, the process 500 makes a determination as to whether a data operation intended for a cloud computing environment has been detected. It is understood that a data operation may be a data computational processing operation or a data storage operation. In response to determining that a data operation intended for a cloud computing environment has been detected, at block 504 the process 500 obtains data geo-location constraints. The data geo-location constraints may be in a form of location-based restrictions regarding remote processing of data away from a processor/client device. The geo-location constraints or location-based restrictions may be specified within a geo-location policy that satisfies regulatory, legal, enterprise, and/or other constraints on data processing locations.

At block 506, the process 500 sends a location-reporting request to a set of distributed remote servers. The set of distributed remote servers may be servers situated within a cloud computing environment. The location-reporting request may be sent in a header request that indicates a data processing request and that instructs any available remote server to respond with a reported geographic location at which the respective server indicates it is located. The data processing request may further include a requested data operation/processing type (e.g., computational processing, storage, etc.). At block 508, the process 500 receives a response with an asserted location from a remote server that has indicated that it is available to process the data as requested in the header request.

At decision point 510, the process 500 makes a determination as to whether the asserted location of the available remote server satisfies the specified location-based restrictions regarding remote processing of the data away from the client device (e.g., processor of the client device). For example, the process 500 may compare the asserted location of the available remote server with the location-based restrictions of at least one geo-location rule, and may determine whether the asserted location complies with the location-based restrictions of the geo-location rule. It should be noted that where the data is being stored, encryption may be appropriate as specified by the location-based restrictions. However, where data is being processed, the data may be sent unencrypted, again as specified by the location-based restrictions. As such, the determination as to whether the asserted location of the available remote server satisfies the specified location-based restrictions regarding remote processing of the data away from the client device may take into account the purpose of sending the data to the respective remote server.

In response to determining that the asserted location of the available remote server does not satisfy the specified location-based restrictions, the process 500 returns to block 506 and iterates as described above to send additional header requests and receive additional asserted locations of one or more available remote servers. As such, the process 500 implements the specified location-based restrictions regarding remote processing of the data away from the client device and does not consider remote servers that are outside of the specified geographic location-based restrictions for data processing and storage.

In response to determining at decision point 510 that the asserted location of the available remote server satisfies the specified location-based restrictions regarding remote processing of the data away from the client device, at block 512 the process 500 sends the asserted location of the remote server and a server identifier of the available remote server to the geo-location assertion server for verification of the asserted location of the remote server. At block 514 the process 500 receives a geo-location validation response from the geo-location assertion server that specifies whether the asserted geographic location is an accurate geographic location of the identified available remote server. The geo-location assertion server may provide the geo-location server validation as a cloud service to a geo-location-aware client device. The geo-location validation response may include a geo-location trust object if the asserted geographic location of the remote server is validated. The geo-location trust object may be formed as trust descriptor. The trust descriptor may be encoded using plain text that has a field signed by a trusted partner, or may be formed using another type of assertion/authorization such as those found in security assertions markup language (SAML), Oauth, extensible access control markup language (XACML), or may be formed using any other syntax as appropriate for a given implementation.

The geo-location-aware client device may evaluate the received geo-location trust object to authenticate the response from the geo-location assertion server. For example, the geo-location trust object may be encrypted using a public/private encryption key technique, where the geo-location assertion server uses its private key to encrypt the geo-location trust object. Evaluation of the geo-location trust object may include using a public key of the geo-location assertion server to decrypt the geo-location trust object, and a valid decryption may confirm that the geo-location trust object is authentic. The geo-location trust object may include information about the request for verification of the asserted geographic location, such as the asserted location of the remote server, the actual location of the remote server, and possibly a confidence level of the geo-location assertion server in the validity of the actual location of the remote server.

As an alternative to using a geo-location trust object that itself provides a direct indication of trustworthiness of an asserted geographic location, the geo-location assertion server may use alternate techniques or protocols that programmatically obfuscate the geo-location trust object or may hide the geo-location trust object information. For example and regarding obfuscation of the geo-location trust object, the geo-location assertion server may return a geo-location trust object that is obfuscated by programmatic modification (e.g., bit fields reversed, rotated, or other change), and the process 500 executing at a geo-location-aware client device may implement a complementary programmatic modification to the received obfuscated geo-location trust object and confirm that the geo-location assertion server is not corrupted by a valid complementary modification.

As a further example and regarding hiding of the geo-location trust object, the received geo-location trust object may be formed as a token that refers back to the full geo-location trust object maintained at the geo-location assertion server, such that only the correct trusted device that is performing the process 500 executing at a geo-location-aware client device may access the full geo-location trust object. Alternatively, the geo-location assertion server may respond with only a token, such as a universal unique identifier (UUID), that indicates that the asserted geographic location of the remote server is valid, but that does not provide additional information. In such an implementation, the process 500 may retrieve any additional information appropriate for a given location validation from the geo-location assertion server using the token.

The process 500 may further store the received geo-location trust object within a geo-location database at block 514, and may reuse the received geo-location trust object for a duration of time, such as a duration of a sequence of the remote data processing or other duration as appropriate for a given implementation. The process 500 may alternatively receive a negative acknowledgement within the geo-location validation response from the geo-location assertion server at block 514 in response to an invalid asserted geographic location of the available remote server, as determined by the geo-location assertion server.

At decision point 516, the process 500 makes a determination as to whether the asserted location of the remote server has been validated by the geo-location assertion server. In response to determining that the asserted location of the remote server has not been validated by the geo-location assertion server, the process 500 generates a report identifying the location verification failure at block 518. Additional processing after generation of the report at block 518 will be deferred and described collectively with additional branches of processing further below.

Returning to the description of decision point 516, in response to determining that the asserted location of the remote server has been validated by the geo-location assertion server, the process 500 makes a determination at decision point 520 as to whether the specified location-based restrictions of at least one geo-location rule specify that data is required to be encrypted when processed at the verified asserted location for the intended data processing purpose. As described above, the purpose of sending the data (e.g., processing versus storage) may be considered, and an acceptable location to be verified by the geo-location assertion server may be selected based upon the intended purpose of sending the data to a remote server.

In response to determining at decision point 520 that the specified location-based restrictions of the geo-location rule specify that data is required to be encrypted when processed at the verified asserted location, the process 500 encrypts the data and sends the data to the location-verified remote server at block 522. It should be noted that once the geo-location aware client device knows the geographic location of a remote server, the geo-location aware client device may deal with the remote server as appropriate for the respective location-based data processing restrictions of the data. The encryption of the data to be transferred to the remote server is an example of such a form of a location-based data processing restriction. Alternatively, the geo-location aware client device may encrypt only one or more parts of the data (e.g., identification numbers, or other sensitive data), again as specified by the location-based data processing restrictions. As another alternative, the geo-location aware client device may utilize a particular storage location as read only. As such, the geo-location aware client device may make these decisions based upon the location-based data processing restrictions specified for the data. In response to determining at decision point 520 that the specified location-based restrictions of the geo-location rule do not specify that data is required to be encrypted when processed at the verified asserted location (e.g., that the data may be sent unencrypted to this verified asserted location), the process 500 sends the unencrypted data to the location-verified remote server at block 524.

Returning to the description of block 518, in response to generating a report identifying the location verification failure, or in response to encrypting and sending the data at block 522, or in response to sending the unencrypted data at block 524, the process 500 transitions to the processing shown and described in association with FIG. 5B.

FIG. 5B illustrates additional processing associated with the process 500 for location-enforced data management in complex multi-region computing that provides additional detail regarding data accesses and data movement within a distributed computing platform. At block 526, the process 500 makes a determination as to whether a data access request has been detected. A data access request may include a query of unencrypted data, a request to retrieve or move encrypted or unencrypted data, or other form of access request as appropriate for a given implementation. In response to determining that a data access request has not been detected, the process 500 makes a determination at decision point 528 as to whether data processing is completed. In response to determining that data processing is not completed at decision point 528, the process 500 iterates until a data access request is detected at decision point 526 or until processing is completed at decision point 528.

Returning to the description of decision point 526, in response to determining that a data access request has been detected, the process 500 retrieves the data from storage at the location-verified remote server at block 530. It should be noted that the processing described above to verify the location of the remote server with the geo-location assertion server may be performed again in association with data retrieval. Alternatively, the obtained geo-location trust object may be relied upon for an appropriate duration to confirm the validity of the remote server as a retrieval location. Additionally, the processing at block 530 to retrieve the data may include a data query to the remote server where the data is unencrypted, and the query response may be received at block 530. As such, many options for data retrieval are possible and all are considered within the scope of the present description.

At decision point 532, the process 500 makes a determination as to whether the retrieved data is encrypted (e.g., where the data was in storage at the remote server). In response to determining that the retrieved data is encrypted, the process 500 decrypts the retrieved data at block 534. In response to decrypting the data at block 534, or in response to determining that the retrieved data is not encrypted at decision point 532, the process 500 makes a determination as to whether a request to move the data has been detected at decision point 536. As described above, a request to move the retrieved data may be made based upon a time of day, based upon querying the data in unencrypted form at a location different from a storage location at which the data was encrypted, or otherwise as appropriate for a given implementation.

At block 538 the process 500 identifies, using the geo-location assertion server, another location-verified available remote server where data may be processed unencrypted based upon the data geo-location constraints. As such, the process may use the geo-location assertion server verification as a cloud-based computing service to identify one or more other location-verified available remote servers geographically located within the restrictions regarding remote processing of unencrypted data away from the geo-location-aware client device. The process 500 moves the data for processing to the other location-verified remote server at block 540. The process 500 accesses the unencrypted data from the location-verified remote server to which the unencrypted data was moved at block 542. In response to accessing the unencrypted data from the location-verified remote server to which the unencrypted data was moved at block 542, or in response to determining not to move the data at decision point 536, the process 500 returns the data to the user at block 544. The process 500 returns to decision point 528 and iterates as described above. In response to determining that processing has been completed at decision point 528, the process 500 returns to the processing described above in association with FIG. 5A at decision point 502 and iterates as described above.

As such, the process 500 processes complex location-based restrictions within geo-location rules that form a portion of geo-location policies implemented to comply with regulatory, legal, enterprise, and other data processing requirements. The process 500 enforces the location-based restrictions for data storage, data retrieval, data access, and data movement within a complex multi-regional computing environment. By enforcing the location-based restrictions, the process 500 allows the geo-location-aware client device to avoid processing of data at servers for which the asserted locations cannot be verified by the geo-location assertion server. Accordingly, the process 500 may prevent spoofing and other forms of misappropriation of data within a complex multi-regional computing environment.

With respect to the preceding description of the process 500, structural and/or functional alternatives for implementation of the described activities include several possible alternatives for certain of the block 500 through the block 524. For example, for block 504, as an alternative to having the geo-location constraints stored in a particular data format or location, the geo-location constraints may be hard-coded into the process 500. For block 506, as an alternative to having a set of location-reporting servers, the process 500 may be implemented where one server performs the geo-location reporting, or the request for the location may be embedded semantically in some other request that may also return the asserted geographic location of the server. For block 508, as an alternative, the process 500 may be implemented to receive the response combined with some other compound response, where the asserted geographic location is included within the compound response. For block 512, the process 500 may, as an alternative, use its own method to determine the validity of the asserted geographic location of the remote server, such as where the asserted geographic location is signed via a trusted party (e.g., a third party or otherwise) using a public/private key pair, the client may check the signature using the public key of that party to perform its own validation of the asserted geographic location. For block 514, the process 500 may, as an alternative, receive from the geo-location assertion server some other indication (other than the geo-location trust object) of the validity of the asserted geographic location, such as an obfuscated geo-location trust object, an unencrypted text geo-location trust object, a Boolean geo-location trust object, or a trust token such as UUID indicating that the asserted geographic location is valid but with no additional information about the remote server. For block 518, as an alternative to reporting the location verification failure, the process 500 may be implemented to use a log file that may report the location verification failure as an audit event to an administrator to alert the administrator that the configuration location is unable to be verified. The log file may also provide notice to the administrator that there may be an untrustworthy server in the cloud. As such, many structural and/or functional alternatives for implementation of the described activities of the process 500 are possible and all are considered within the scope of the present subject matter.

As described above in association with FIG. 1 through FIG. 5B, the example systems and processes provide location-enforced data management in complex multi-region computing. Many other variations and additional activities associated with location-enforced data management in complex multi-region computing are possible and all are considered within the scope of the present subject matter.

Those skilled in the art will recognize, upon consideration of the above teachings, that certain of the above examples are based upon use of a programmed processor, such as the one or more processors or processing units 16. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   sending, by a processor to at least one remote server, a location-reporting request that requests processing of data away from a geo-location-aware client device and that instructs any available server to respond with a reported geographic location;
   receiving an asserted geographic location from a remote server available to process the data;
   determining whether the asserted geographic location of the available remote server satisfies location-based data processing restrictions that regulate remote processing of the data away from the geo-location-aware client device;
   verifying, responsive to determining that the asserted geographic location of the available remote server satisfies the location-based data processing restrictions, the asserted geographic location using a geo-location assertion server, where verifying the asserted geographic location using the geo-location assertion server comprises:
   sending the asserted geographic location of the available remote server and a server identifier of the available remote server to the geo-location assertion server; and
   receiving a geo-location verification response from the geo-location assertion server that specifies whether the asserted geographic location is an accurate geographic location of the identified available remote server, where receiving the geo-location verification response from the geo-location assertion server comprises:
   receiving, in response to a successful verification of the asserted geographic location of the available remote server, a geo-location trust object within the geo-location verification response from the geo-location assertion server; and
   the method further comprising:
   sending, in response to the successful verification of the asserted geographic location of the available remote server, the data to the available remote server to process.

2. The method of claim 1, where determining whether the asserted geographic location of the available remote server satisfies the location-based data processing restrictions that regulate remote processing of the data away from the geo-location-aware client device comprises:
   identifying at least one geo-location rule that defines the location-based data processing restrictions;
   comparing the asserted geographic location of the available remote server with the location-based data processing restrictions defined within the at least one geo-location rule; and
   determining whether the asserted geographic location complies with the location-based data processing restrictions defined within the at least one geo-location rule.

3. The method of claim 1, where receiving the geo-location verification response from the geo-location assertion server that specifies whether the asserted geographic location is the accurate geographic location of the identified available remote server further comprises:
   receiving, in response to the asserted geographic location of the available remote server being inaccurate, a negative acknowledgement within the geo-location verification response from the geo-location assertion server.

4. The method of claim 1, further comprising:
   determining whether the location-based data processing restrictions specify that data is required to be encrypted when processed at the verified asserted geographic location of the available remote server; and
   where sending, in response to the successful verification of the asserted geographic location of the available remote server, the data to the available remote server to process comprises:

sending the data as encrypted data in response to determining that the location-based data processing restrictions specify that the data is required to be encrypted when processed at the verified asserted geographic location of the available remote server; and sending the data as unencrypted data in response to determining that the location-based data processing restrictions specify that the data is not required to be encrypted when processed at the verified asserted geographic location of the available remote server.

5. The method of claim 1, where the data sent to the available remote server to process comprises encrypted data to store at the available remote server, and where the location-based data processing restrictions further comprise geographic restrictions that regulate remote processing of unencrypted data away from the geo-location-aware client device, and further comprising, responsive to determining to access the encrypted data in unencrypted form:

determining whether a received asserted geographic location of another available remote server satisfies the geographic restrictions that regulate remote processing of unencrypted data away from the geo-location-aware client device;

verifying, responsive to determining that the asserted geographic location of the other available remote server satisfies the geographic restrictions, the asserted geographic location of the other available remote server using the geo-location assertion server;

retrieving the encrypted data from the available remote server;

unencrypting the encrypted data;

moving the unencrypted data to the other available remote server with the verified asserted geographic location that satisfies the geographic restrictions; and accessing the data in unencrypted form at the other available remote server.

6. The method of claim 1, where the at least one remote server and the geo-location assertion server reside within and operate as part of a cloud computing environment, and the geo-location assertion server provides verification of asserted geographic locations of cloud-based servers as a cloud-based computing service.

7. A system, comprising:
a memory; and
a processor programmed to:
send, to at least one remote server, a location-reporting request that requests processing of data away from a geo-location-aware client device and that instructs any available server to respond with a reported geographic location;
receive an asserted geographic location from a remote server available to process the data;
determine whether the asserted geographic location of the available remote server satisfies location-based data processing restrictions stored within the memory that regulate remote processing of the data away from the geo-location-aware client device;
verify, responsive to determining that the asserted geographic location of the available remote server satisfies the location-based data processing restrictions, the asserted geographic location using a geo-location assertion server, where, in being programmed to verify the asserted geographic location using the geo-location assertion server, the processor is programmed to:

send the asserted geographic location of the available remote server and a server identifier of the available remote server to the geo-location assertion server; and
receive a geo-location verification response from the geo-location assertion server that specifies whether the asserted geographic location is an accurate geographic location of the identified available remote server, where, in being programmed to receive the geo-location verification response from the geo-location assertion server, the processor is programmed to:
receive, in response to a successful verification of the asserted geographic location of the available remote server, a geo-location trust object within the geo-location verification response from the geo-location assertion server; and
where the processor is further programmed to:
send, in response to the successful verification of the asserted geographic location of the available remote server, the data to the available remote server to process.

8. The system of claim 7, where, in being programmed to determine whether the asserted geographic location of the available remote server satisfies the location-based data processing restrictions stored within the memory that regulate remote processing of the data away from the geo-location-aware client device, the processor is programmed to:
identify at least one geo-location rule that defines the location-based data processing restrictions;
compare the asserted geographic location of the available remote server with the location-based data processing restrictions defined within the at least one geo-location rule; and
determine whether the asserted geographic location complies with the location-based data processing restrictions defined within the at least one geo-location rule.

9. The system of claim 7, where, in being programmed to receive the geo-location verification response from the geo-location assertion server that specifies whether the asserted geographic location is the accurate geographic location of the identified available remote server, the processor is further programmed to:
receive, in response to the asserted geographic location of the available remote server being inaccurate, a negative acknowledgement within the geo-location verification response from the geo-location assertion server.

10. The system of claim 7, where the processor is further programmed to:
determine whether the location-based data processing restrictions specify that data is required to be encrypted when processed at the verified asserted geographic location of the available remote server; and
where, in being programmed to send, in response to the successful verification of the asserted geographic location of the available remote server, the data to the available remote server to process, the processor is programmed to:
send the data as encrypted data in response to determining that the location-based data processing restrictions specify that the data is required to be encrypted when processed at the verified asserted geographic location of the available remote server; and
send the data as unencrypted data in response to determining that the location-based data processing restrictions specify that the data is not required to be encrypted when processed at the verified asserted geographic location of the available remote server.

11. The system of claim 7, where:

the at least one remote server and the geo-location assertion server reside within and operate as part of a cloud computing environment;

the geo-location assertion server provides verification of asserted geographic locations of cloud-based servers as a cloud-based computing service;

the data sent to the available remote server to process comprises encrypted data to store at the available remote server;

the location-based data processing restrictions further comprise geographic restrictions that regulate remote processing of unencrypted data away from the geo-location-aware client device; and the processor is further programmed to, responsive to determining to access the encrypted data in unencrypted form:
   determine whether a received asserted geographic location of another available remote server satisfies the geographic restrictions that regulate remote processing of unencrypted data away from the geo-location-aware client device;
   verify, responsive to determining that the asserted geographic location of the other available remote server satisfies the geographic restrictions, the asserted geographic location of the other available remote server using the geo-location assertion server;
   retrieve the encrypted data from the available remote server;
   unencrypt the encrypted data;
   move the unencrypted data to the other available remote server with the verified asserted geographic location that satisfies the geographic restrictions; and
   access the data in unencrypted form at the other available remote server.

12. A computer program product, comprising:

a computer readable storage medium having computer readable program code embodied therewith, where the computer readable storage medium is not a transitory signal per se, and where the computer readable program code when executed on a computer causes the computer to:

send, to at least one remote server, a location-reporting request that requests processing of data away from a geo-location-aware client device and that instructs any available server to respond with a reported geographic location;

receive an asserted geographic location from a remote server available to process the data;

determine whether the asserted geographic location of the available remote server satisfies location-based data processing restrictions that regulate remote processing of the data away from the geo-location-aware client device;

verify, responsive to determining that the asserted geographic location of the available remote server satisfies the location-based data processing restrictions, the asserted geographic location using a geo-location assertion server, where, in causing the computer to verify the asserted geographic location using the geo-location assertion server, the computer readable program code when executed on the computer causes the computer to:

send the asserted geographic location of the available remote server and a server identifier of the available remote server to the geo-location assertion server; and receive a geo-location verification response from the geo-location assertion server that specifies whether the asserted geographic location is an accurate geographic location of the identified available remote server, where, in causing the computer to receive the geo-location verification response from the geo-location assertion server, the computer readable program code when executed on the computer causes the computer to:
   receive, in response to a successful verification of the asserted geographic location of the available remote server, a geo-location trust object within the geo-location verification response from the geo-location assertion server; and
   where the computer readable program code when executed on the computer further causes the computer to:
send, in response to the successful verification of the asserted geographic location of the available remote server, the data to the available remote server to process.

13. The computer program product of claim 12, where, in causing the computer to determine whether the asserted geographic location of the available remote server satisfies the location-based data processing restrictions that regulate remote processing of the data away from the geo-location-aware client device, the computer readable program code when executed on the computer causes the computer to:
   identify at least one geo-location rule that defines the location-based data processing restrictions;
   compare the asserted geographic location of the available remote server with the location-based data processing restrictions defined within the at least one geo-location rule; and
   determine whether the asserted geographic location complies with the location-based data processing restrictions defined within the at least one geo-location rule.

14. The computer program product of claim 12, where, in causing the computer to receive the geo-location verification response from the geo-location assertion server that specifies whether the asserted geographic location is the accurate geographic location of the identified available remote server, the computer readable program code when executed on the computer further causes the computer to:
   receive, in response to the asserted geographic location of the available remote server being inaccurate, a negative acknowledgement within the geo-location verification response from the geo-location assertion server.

15. The computer program product of claim 12, where the computer readable program code when executed on the computer further causes the computer to:
   determine whether the location-based data processing restrictions specify that data is required to be encrypted when processed at the verified asserted geographic location of the available remote server; and
   where, in causing the computer to send, in response to the successful verification of the asserted geographic location of the available remote server, the data to the available remote server to process, the computer readable program code when executed on the computer causes the computer to:
   send the data as encrypted data in response to determining that the location-based data processing restrictions specify that the data is required to be encrypted when processed at the verified asserted geographic location of the available remote server; and send the data as unencrypted data in response to determining that the location-based data processing restrictions specify that the data is not required to be encrypted when processed at the verified asserted geographic location of the available remote server.

16. The computer program product of claim 12, where the data sent to the available remote server to process comprises encrypted data to store at the available remote server, and where the location-based data processing restrictions further comprise geographic restrictions that regulate remote processing of unencrypted data away from the geo-location-aware client device, and the computer readable program code when executed on the computer further causes the computer to, responsive to determining to access the encrypted data in unencrypted form:

determine whether a received asserted geographic location of another available remote server satisfies the geographic restrictions that regulate remote processing of unencrypted data away from the geo-location-aware client device;

verify, responsive to determining that the asserted geographic location of the other available remote server satisfies the geographic restrictions, the asserted geographic location of the other available remote server using the geo-location assertion server;

retrieve the encrypted data from the available remote server;

unencrypt the encrypted data;

move the unencrypted data to the other available remote server with the verified asserted geographic location that satisfies the geographic restrictions; and access the data in unencrypted form at the other available remote server.

17. The computer program product of claim 12, where the at least one remote server and the geo-location assertion server reside within and operate as part of a cloud computing environment, and the geo-location assertion server provides verification of asserted geographic locations of cloud-based servers as a cloud-based computing service.

* * * * *